US012302487B2

(12) United States Patent
Tam et al.

(10) Patent No.: US 12,302,487 B2
(45) Date of Patent: May 13, 2025

(54) PARTICLE ACCELERATOR HAVING NOVEL ELECTRODE CONFIGURATION FOR QUADRUPOLE FOCUSING

(71) Applicant: Applied Materials, Inc., Santa Clara, CA (US)

(72) Inventors: Wai-Ming Tam, Manchester-by-the-Sea, MA (US); Frank Sinclair, Hartland, ME (US)

(73) Assignee: Applied Materials, Inc., Santa Clara, CA (US)

( * ) Notice: Subject to any disclaimer, the term of this patent is extended or adjusted under 35 U.S.C. 154(b) by 157 days.

(21) Appl. No.: 17/956,192

(22) Filed: Sep. 29, 2022

(65) Prior Publication Data

US 2024/0114613 A1 Apr. 4, 2024

(51) Int. Cl.

*H05H 7/22* (2006.01)
*H05H 7/02* (2006.01)
*H05H 9/04* (2006.01)

(52) U.S. Cl.

CPC ................ *H05H 7/22* (2013.01); *H05H 7/02* (2013.01); *H05H 9/042* (2013.01); *H05H 2007/025* (2013.01); *H05H 2007/222* (2013.01)

(58) Field of Classification Search

CPC ............ H05H 7/02; H05H 7/22; H05H 9/042; G05G 2007/025; G05G 2007/222
See application file for complete search history.

(56) References Cited

U.S. PATENT DOCUMENTS

| | | | |
|---|---|---|---|
| 4,667,111 A | 5/1987 | Glavish et al. | |
| 4,712,042 A | 12/1987 | Hamm | |
| 6,153,880 A | 11/2000 | Russ et al. | |
| 6,407,505 B1 | 6/2002 | Bertsche | |
| 6,777,893 B1 | 8/2004 | Swenson | |
| 6,855,942 B2 | 2/2005 | Bechthold | |
| 6,888,326 B2 * | 5/2005 | Amaldi .................... | H05H 7/22 315/5.43 |
| 7,098,615 B2 | 8/2006 | Swenson | |
| 7,138,771 B2 | 11/2006 | Bechthold | |
| 10,362,666 B2 | 7/2019 | Mustapha et al. | |
| 10,824,163 B2 | 11/2020 | Einecke | |

(Continued)

FOREIGN PATENT DOCUMENTS

| | | |
|---|---|---|
| CN | 113747651 B | 8/2022 |
| EP | 1056113 A2 | 11/2000 |

OTHER PUBLICATIONS

International Search Report and Written Opinion for Application No. PCT/US2023/033996 dated Jan. 18, 2024.

(Continued)

*Primary Examiner* — Raymond R Chai
(74) *Attorney, Agent, or Firm* — KDW FIRM PLLC

(57) ABSTRACT

An apparatus may include a drift tube assembly, comprising a plurality of drift tubes to conduct an ion beam along a beam propagation direction. The plurality of drift tubes may define a multi-gap configuration corresponding to a plurality of acceleration gaps, wherein the plurality of drift tubes further define a plurality of RF quadrupoles, respectively. As such, the plurality of quadrupoles are arranged to defocus the ion beam along a first direction at the plurality of acceleration gaps, respectively, where the first direction extends perpendicularly to the beam propagation direction.

8 Claims, 6 Drawing Sheets

(56) References Cited

U.S. PATENT DOCUMENTS

| | | | | |
|---|---|---|---|---|
| 2004/0084634 | A1 | 5/2004 | Bechthold | |
| 2004/0212331 | A1* | 10/2004 | Swenson | H05H 7/22 315/506 |
| 2005/0134204 | A1 | 6/2005 | Bechthold | |
| 2011/0089321 | A1 | 4/2011 | Glavish et al. | |
| 2015/0144810 | A1 | 5/2015 | Sinclair | |
| 2017/0169987 | A1 | 6/2017 | Lee | |
| 2018/0092197 | A1* | 3/2018 | Yamamoto | H05H 13/04 |
| 2018/0269033 | A1 | 9/2018 | Sinclair | |
| 2019/0371562 | A1* | 12/2019 | Sinclair | H05H 9/00 |
| 2020/0066486 | A1 | 2/2020 | Sinclair | |
| 2020/0234918 | A1 | 7/2020 | Sinclair | |
| 2020/0357603 | A1 | 11/2020 | Sinclair | |
| 2021/0111012 | A1* | 4/2021 | Osgood | G01N 27/623 |
| 2022/0037116 | A1 | 2/2022 | Sinclair | |
| 2022/0174810 | A1 | 6/2022 | Biloiu | |
| 2022/0183137 | A1 | 6/2022 | Sinclair | |
| 2022/0238302 | A1* | 7/2022 | Futakuchi | H01J 37/3023 |
| 2022/0248523 | A1* | 8/2022 | Sinclair | H05H 7/02 |
| 2024/0114613 | A1* | 4/2024 | Tam | H05H 7/02 |

OTHER PUBLICATIONS

International Preliminary Report on Patentability for the International Application No. PCT/US2021/063611, mailed Aug. 10, 2023, 6 pages.

International Search Report and Written Opinion dated Apr. 12, 2022, for the International Patent Application No. PCT/US2021/063611, filed on Dec. 15, 2021, 8 pages.

* cited by examiner

PARTICLE ACCELERATOR HAVING NOVEL ELECTRODE CONFIGURATION FOR QUADRUPOLE FOCUSING

FIELD OF THE DISCLOSURE

The disclosure relates generally to ion implantation apparatus and more particularly to high energy beamline ion implanters.

BACKGROUND OF THE DISCLOSURE

Ion implantation is a process of introducing dopants or impurities into a substrate via bombardment. Ion implantation systems may comprise an ion source and a series of beam-line components. The ion source may comprise a chamber where ions are generated. The ion source may also comprise a power source and an extraction electrode assembly disposed near the chamber. The beam-line components, may include, for example, a mass analyzer, a first acceleration or deceleration stage, a collimator, and a second acceleration or deceleration stage. Much like a series of optical lenses for manipulating a light beam, the beam-line components can filter, focus, and manipulate ions or ion beam having particular species, shape, energy, and/or other qualities. The ion beam passes through the beam-line components and may be directed toward a substrate mounted on a platen or clamp.

Implantation apparatus capable of generating ion energies of approximately 1 MeV or greater are often referred to as high energy ion implanters, or high energy ion implantation systems. One type of high energy ion implanter is termed linear accelerator, or LINAC, where a series of electrodes arranged as tubes conduct and accelerate the ion beam to increasingly higher energy along the succession of tubes, where the electrodes receive a powered voltage signal. Known LINACs are driven by an RF voltage of frequency in the MHz-GHz range.

One issue for operation of RF LINAC ion implanters is that during acceleration of an ion beam, which ion beam is partitioned into ion bunches along a direction of propagation (Z-direction), a natural tendency of an ion bunch is to spread out both transversely (in X-direction and Y-direction) as well as longitudinally (in Z-direction, or equivalently, in time). Known methods for focusing ions are generally complex and may require unduly lengthy acceleration stages to focus the accelerating ion bunches.

In some approaches, transverse focusing of ions may be performed adding DC quadrupoles. These DC quadrupoles may be added at various stages along a LINAC, which stages include drift tube electrodes that are used to accelerate the ion bunches. Such DC quadrupoles may be fabricated as electrostatic or magnetic components that apply a DC quadrupole field to a passing ion beam. The addition of these DC quadrupoles to a LINAC inevitably add cost, size and complexity to the beamline and the associated control systems.

With respect to these and other considerations the present disclosure is provided.

BRIEF SUMMARY

In one embodiment an apparatus is provided. The apparatus may include a drift tube assembly that includes a plurality of drift tubes to conduct an ion beam along a beam propagation direction. The plurality of drift tubes may define a multi-gap configuration corresponding to a plurality of acceleration gaps. The plurality of drift tubes may further define a plurality of RF quadrupoles, respectively, wherein the plurality of RF quadrupoles are arranged to defocus the ion beam along a first direction at the plurality of acceleration gaps, respectively, the first direction extending perpendicularly to the beam propagation direction.

In another embodiment, a linear accelerator may include a buncher to receive a continuous ion beam and output a bunched ion beam; and a plurality of acceleration stages, to accelerate and focus the bunched ion beam. The plurality of acceleration stages may include a first acceleration stage, having a first drift tube assembly that forms a multi-gap configuration corresponding to a plurality of acceleration gaps. The first drift tube assembly may further define a first plurality of RF quadrupoles formed at the plurality of acceleration gaps, respectively. As such, the first plurality of RF quadrupoles may be arranged to defocus the bunched ion beam along a first direction at the plurality of acceleration gaps, respectively, the first direction extending perpendicularly to a beam propagation direction. The plurality of acceleration stages may further include a second acceleration stage, having a second drift tube assembly that forms the multi-gap configuration, where the second drift tube assembly further defines a second plurality of RF quadrupoles formed at the plurality of acceleration gaps, respectively. As such, the second plurality of quadrupoles may be arranged to focus the ion beam at a given gap of the plurality of acceleration gaps along the first direction.

In another embodiment, an ion implanter may include an ion source, to generate a continuous ion beam, and a linear accelerator, comprising a buncher and a plurality of acceleration stages arranged to receive the continuous ion beam and generate a bunched ion beam. The plurality of acceleration stages may include a first acceleration stage, having a first drift tube assembly that forms a multi-gap configuration corresponding to a first plurality of acceleration gaps. The first drift tube assembly may further define a first plurality of RF quadrupoles formed at the plurality of first acceleration gaps, respectively. As such, the first plurality of quadrupoles may be arranged to defocus the ion beam at a given gap of the first plurality of acceleration gaps along a first direction, extending perpendicular to the beam propagation direction. The plurality of acceleration stages may also include a second acceleration stage, having a second drift tube assembly that forms the multi-gap configuration corresponding to a second plurality of acceleration gaps. The second drift tube assembly may further define a plurality of RF quadrupoles formed at the second plurality of acceleration gaps, respectively. As such, the second plurality of RF quadrupoles may be arranged to focus the bunched ion beam at a given gap of the second plurality of acceleration gaps along the first direction.

Figure 1A:
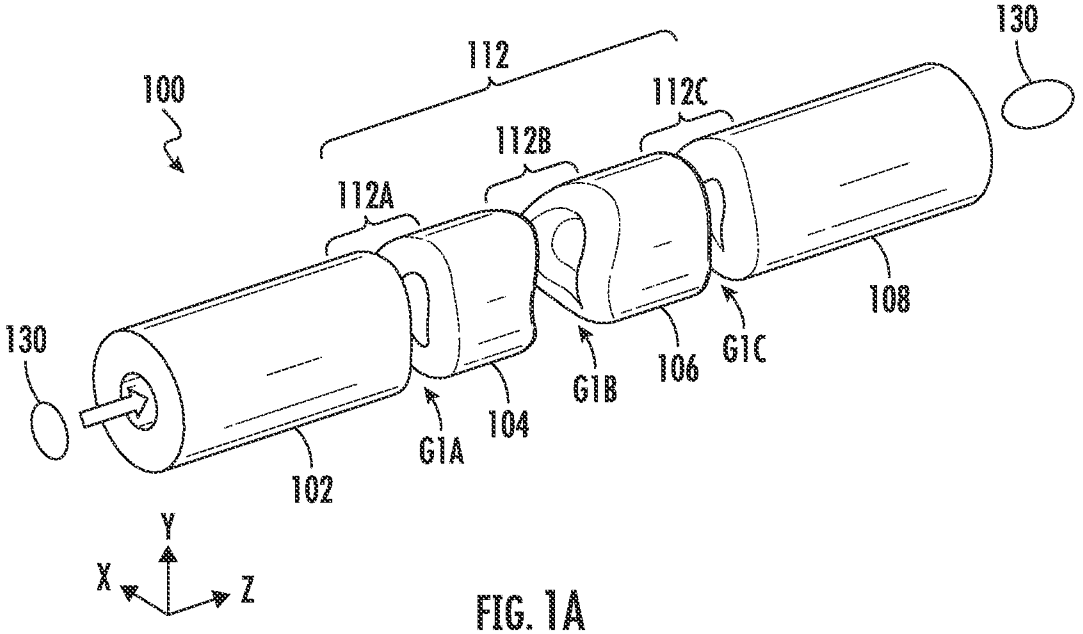
FIG. 1A shows an exemplary drift tube assembly, according to embodiments of the disclosure.

The drawings are not necessarily to scale. The drawings are merely representations, not intended to portray specific parameters of the disclosure. The drawings are intended to depict exemplary embodiments of the disclosure, and therefore are not be considered as limiting in scope. In the drawings, like numbering represents like elements.

DETAILED DESCRIPTION

An apparatus, system and method in accordance with the present disclosure will now be described more fully hereinafter with reference to the accompanying drawings, where embodiments of the system and method are shown. The system and method may be embodied in many different forms and are not be construed as being limited to the embodiments set forth herein. Instead, these embodiments are provided so this disclosure will be thorough and complete, and will fully convey the scope of the system and method to those skilled in the art.

Terms such as "top," "bottom," "upper," "lower," "vertical," "horizontal," "lateral," and "longitudinal" may be used herein to describe the relative placement and orientation of these components and their constituent parts, with respect to the geometry and orientation of a component of a semiconductor manufacturing device as appearing in the figures. The terminology may include the words specifically mentioned, derivatives thereof, and words of similar import.

As used herein, an element or operation recited in the singular and proceeded with the word "a" or "an" are understood as potentially including plural elements or operations as well. Furthermore, references to "one embodiment" of the present disclosure are not intended to be interpreted as precluding the existence of additional embodiments also incorporating the recited features.

Provided herein are approaches for improved high energy ion implantation systems and components, based upon a beamline architecture, and in particular, ion implanters based upon linear accelerators. For brevity, an ion implantation system may also be referred to herein as an "ion implanter." Various embodiments entail novel approaches that provide the capability of improved control of an ion beam during acceleration through the acceleration stages of a linear accelerator, and in particular, improved ion beam focusing.

FIG. 1A shows an exemplary apparatus according to embodiments of the disclosure. The apparatus 100 may represent an acceleration stage of a linear accelerator, such as a linear accelerator arranged within an ion implanter, as discussed below with respect to FIG. 8. More particularly the apparatus 100 depicts a drift tube assembly for accelerating an ion beam in an acceleration stage of a linear accelerator. The drift tube assembly in this embodiment and other embodiments to follow is formed of a plurality of hollow cylinders that conduct an ion beam in the cavities formed by the hollow cylinders. In particular, the apparatus 100 defines a triple gap configuration, where an ion beam is conducted through three accelerating gaps, discussed in more detail below. As such, the apparatus 100 is arranged to transmit and accelerate a bunched ion beam, shown as an ion beam 130, along a beam path that extends through the hollow cylinders and parallel to the Z-axis of the Cartesian coordinate system shown.

The apparatus 100 is formed of a plurality of drift tubes (collectively deemed a drift tube assembly), including a first grounded drift tube 102, a second grounded drift tube 108, a first powered drift tube 104, disposed downstream of the first grounded drift tube 102, and a second powered drift tube 106, disposed downstream of the first powered drift tube 104. It may be understood that the drift tube assembly formed by the apparatus 100 is coupled to a resonator (not separately shown), where the resonator is arranged to output an RF signal. In the configuration of FIG. 1A, opposite ends of a given resonator are to be connected to the first powered drift tube 104, and the second powered drift tube 106. Accordingly, when an RF power generator (not shown) delivers RF power to the resonator, an RF signal is generated at the first powered drift tube 104 and at the second powered drift tube 106. The generated RF voltages have sinusoidal temporal variation and may have a phase difference of 180 degrees, which variation means the voltage on the first powered drift tube 104 is equal but opposite polarity as the voltage on the second powered drift tube 106. A sinusoidal time-varying electric field thus develops across gap G1B, proportional to twice the instantaneous value of the RF voltage signal, and varying according to the frequency of the applied RF voltage signal. Likewise, time-varying electric fields of the same frequency but having different amplitude develops across gap G1A, between the first grounded drift tube 102 and first powered drift tube 104, and across the gap G1C, between the second powered drift tube 106 and second grounded drift tube 108.

Note that the apparatus 100 is may be arranged to accept the ion beam 130 as a bunched ion beam, where upstream to the apparatus 100 the ion beam 130 may be a continuous ion beam, and may be bunched by a buncher (not shown), arranged according to known LINACs. As such, by properly arranging the timing of the arrival of a bunch of ions of the ion beam 130 at the gap G1A, gap G1B, gap G1C, the ion beam 130 may be accelerated by electric fields that are created when the generated RF voltage on the powered electrodes reach an optimum value and has the right polarity. In this manner, a given bunch may be accelerated generally along the Z-axis of the Cartesian coordinate system shown. At the same time, the bunched ions may tend to defocus in the X-direction and Y-direction. To counteract this tendency, the apparatus 100 is equipped with a RF quadrupole arrangement 112, which arrangement may also be referred to as a quadrupole triplet. The RF quadrupole arrangement 112 includes a plurality of RF quadrupoles that are formed integrally within the different drift tubes including first grounded drift tube 102, second grounded drift tube 108, first powered drift tube 104, and second powered drift tube 106. A given RF quadrupole of the quadrupole arrangement 112 is defined by a given drift tube or pair of drift tubes, and in particular is formed by shaping of the surfaces of the drift tubes that face a given acceleration gap, as shown in FIG. 1A. Thus, the RF quadrupole arrangement 112 for the given drift tubes of apparatus 100 is formed integrally as part of the apparatus 100. The shaping of the drift tube surface at the gaps G1A, G1B, and G1C will define different electric field strength across these gaps, as a function of angle with respect to Y-axis within the X-Y plane. Thus, this variation in electric field strength will exert a quadrupole effect that expands the ion beam 130 along a given direction, such as the X-direction, and focuses the ion beam 130 along a direction orthogonal to the given direction, such as along the Y-direction.

In the embodiment of FIG. 1A and other embodiments to follow, the first quadrupole 112A, second quadrupole 112B, and third quadrupole 112C define an elliptical shape, as shown. According to some embodiments, the shapes of the various opposing drift tubes may form complementary matches to one another. In particular, a downstream surface of the first grounded drift tube 102 may form a complementary match to an upstream surface of the first powered drift tube 104. Likewise, a downstream surface of the first powered drift tube 104 may form a complementary match to an upstream surface of the second powered drift tube 106, while a downstream surface of the second powered drift tube 106 forms a complementary match to an upstream surface of the second grounded drift tube 108. Said differently, the opposing surfaces that form each quadrupole, if brought together, may fit one another as a three-dimensional jigsaw coupling. While the embodiment of FIG. 1A and other embodiments to follow may provide examples where protrusions formed in a drift tube surface at an acceleration gap have an elliptical shape, the present embodiments cover any suitable shape for a drift tube surface, including a sinusoidal shape or other shapes that are effective to from a quadrupole.

In accordance with embodiments of the disclosure, the plurality of quadrupoles of apparatus 100 are each arranged to defocus the ion beam 130 at a given gap (G1A, G1B, G1C) of the plurality of acceleration gaps along a first direction (either X-direction or Y-direction), extending perpendicular to a beam propagation direction (Z-axis, in the direction of the arrow). In other words, when the ion beam 130 traverses the gap G1A, gap G1B, and gap G1C, the ion beam is defocused at each of these gaps along the same direction (meaning parallel to the same axis). For example, the ion beam 130 may be defocused along the Y-direction at each of the gaps G1A, gap G1B, and gap G1C. Likewise, the plurality of quadrupoles of apparatus 100 are each arranged to focus the ion beam 130 at a given gap (G1A, G1B, G1C) of the plurality of acceleration gaps along a second direction, extending perpendicular to the beam propagation direction and to the first direction. In other words, following the above example where the ion beam is defocused along the Y-direction at each gap, the ion beam 130 may be focused along the X-direction at each of the gaps G1A, gap G1B, and gap G1C.

For purposes of concision, the arrangement of the apparatus 100 may be referred to hereinafter as a local "DODODO" (defocus-defocus-defocus) configuration, indicating for a given direction, such as the Y-direction, a defocusing (DO) of the ion beam takes place at three consecutive acceleration gaps. As a corollary, for the given local DODODO configuration with respect to the Y-direction, the apparatus 100 likewise provides a local FOFOFO (focus-focus-focus) configuration with respect to the X-direction, meaning that a focusing (FO) of the ion beam takes place at three consecutive acceleration gaps. As detailed further below, this novel configuration of a drift tube assembly provided by apparatus 100 may be combined with similar structures to assemble a linear accelerator whose beam focusing capability may be tuned according to given applications.

Figure 1B:
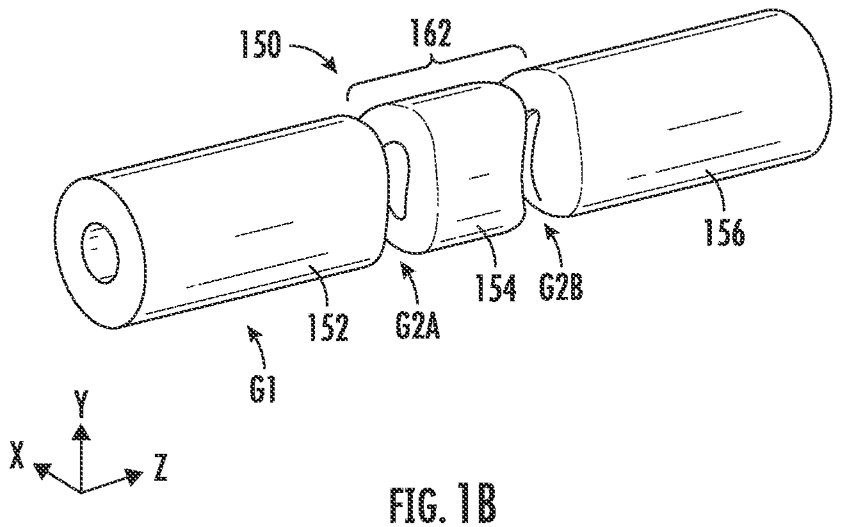
FIG. 1B shows another exemplary drift tube assembly, according to embodiments of the disclosure.

Turning now to FIG. 1B there is shown another exemplary drift tube assembly, according to embodiments of the disclosure. The apparatus 150 may represent an acceleration stage of a linear accelerator, similarly to apparatus 100. The apparatus 150 is formed of a plurality of drift tubes (collectively forming a drift tube assembly), including a first grounded drift tube 152, a second grounded drift tube 156, and a powered drift tube 154, disposed between the first grounded drift tube 152 and the second grounded drift tube 156.

Note that the apparatus 150 may also be arranged to accept an ion beam (not shown) as a bunched ion beam, where upstream to the apparatus 100 the ion beam may be a continuous ion beam, and may be bunched by a buncher (not shown), arranged according to known LINACs. As such, by properly arranging the timing of the arrival of a bunch of ions of the ion beam at the gap G2A, gap G2B, the ion beam be accelerated by electric fields that are created when the generated RF voltage on the powered drift tube 154 reaches a maximum value and has the right polarity. In this manner, a given bunch may be accelerated generally along the Z-axis of the Cartesian coordinate system shown. To counteract the tendency of beam defocus, the apparatus 150 is equipped with a RF quadrupole arrangement 162 (a quadrupole doublet), connected to the drift tube assembly, and arranged circumferentially around the beam path, where the beam path is contained within the hollow cylinders that form the drift tube assembly of FIG. 1B.

A given RF quadrupole of the quadrupole that is defined by a given drift tube or pair of drift tubes is formed by shaping of the surfaces of the drift tubes that face a given acceleration gap, as shown in FIG. 1B. Thus, the RF quadrupole arrangement 162 for the given drift tubes of apparatus 150 is formed integrally as part of the apparatus 100. The shaping of the drift tube surface at the gaps G2A, G2B, will define different electric field strength across these gaps, as a function of angle with respect to Y-axis within the X-Y plane. Thus, this variation is electric field strength will exert a quadrupole effect that expands an ion beam along a given direction, such as the X-direction, and focuses the ion beam along a direction orthogonal to the given direction, such as along the Y-direction, as discussed previously.

In accordance with embodiments of the disclosure, the plurality of quadrupoles of apparatus 150 are each arranged to defocus an ion beam at a given gap (G2A, G2B) of the plurality of acceleration gaps along a first direction (either X-direction or Y-direction), extending perpendicular to a beam propagation direction (Z-axis). For example, the given ion beam may be defocused along the Y-direction at each of the gaps G2A, gap G2B. Likewise, the plurality of quadrupoles of apparatus 150 are each arranged to focus the ion beam at a given gap (G2A, G2B) of the plurality of acceleration gaps along a second direction, extending perpendicular to the beam propagation direction and to the first direction. In other words, following the above example where the ion beam is defocused along the Y-direction at each gap, the ion beam may be focused along the X-direction at each of the gaps G2A, gap G2B.

Following the convention of FIG. 1A, the arrangement of the apparatus 150 may be referred to hereinafter as a local "DODO" (defocus-defocus) configuration, indicating for a given direction, such as the Y-direction, a defocusing (DO) of the ion beam takes place at two consecutive acceleration gaps. As a corollary, for the given local DODO configuration with respect to the Y-direction, the apparatus 150 likewise provides a local FOFO (focus-focus) configuration with respect to the X-direction, meaning that a focusing (FO) of the ion beam takes place at two consecutive acceleration gaps.

Figure 1C:
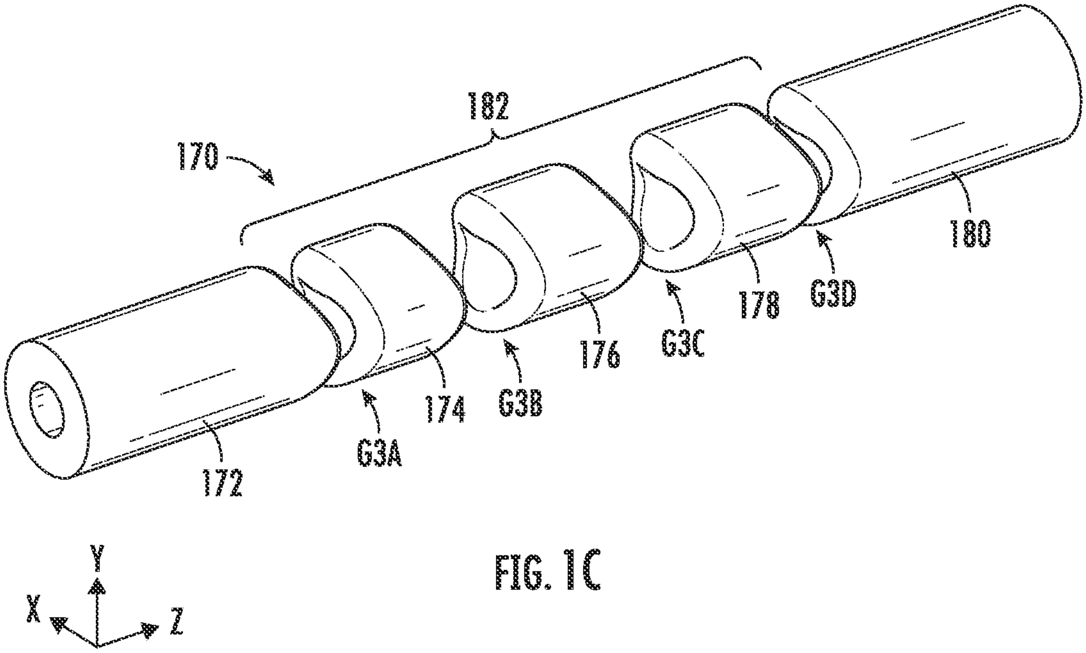
FIG. 1C shows a further exemplary drift tube assembly, according to embodiments of the disclosure.

In additional embodiments, the "DODO" or "DODODO" configurations may be extended to drift tube assemblies that have more than three gaps within a given acceleration stage. In other words, such drift tube assemblies will also exert a same quadrupole configuration for each acceleration gap of a drift tube assembly formed with four or more gaps. FIG. 1C shows a further exemplary drift tube assembly, according to embodiments of the disclosure. The apparatus 170 may also represent an acceleration stage of a linear accelerator, as in FIG. 1A and FIG. 1B. In particular, the apparatus 100 defines a four-gap configuration, where an ion beam is conducted through four accelerating gaps, discussed in more detail below. As such, the apparatus 170 is arranged to transmit and accelerate a bunched ion beam (not shown, but see ion beam 130) along a beam path that extends through the hollow cylinders and parallel to the Z-axis of the Cartesian coordinate system shown.

The apparatus 170 is formed of a plurality of drift tubes, including a first grounded drift tube 172, a second grounded drift tube 180, a first powered drift tube 174, a second powered drift tube 176, and a third powered drift tube 178, disposed downstream of the second powered drift tube 176. It may be understood that the drift tube assembly formed by the apparatus 170 is coupled receive RF voltage signals at the three powered drift tubes (which drift tubes may be termed RF drift tubes), in a manner to generate time varying electric fields across the acceleration gap G3A, acceleration gap G3B, acceleration gap G3C, and acceleration gap G3D, in a manner designed to accelerate a passing bunched ion beam at each of these acceleration gaps.

At the same time, the bunched ions may tend to defocus in the X-direction and Y-direction. To counteract this tendency, the apparatus 170 is equipped with a RF quadrupole arrangement 182, which arrangement may also be referred to as a quadrupole quartet. The RF quadrupole arrangement 182 includes a plurality of RF quadrupoles that are formed integrally within the different drift tubes including first grounded drift tube 172, second grounded drift tube 180, first powered drift tube 174, and second powered drift tube 176, and third powered drift tube 178. A given RF quadrupole of the RF quadrupole arrangement 182 is defined by a given drift tube or pair of drift tubes as discussed previously. Thus, the RF quadrupole arrangement 182 for the given drift tubes of apparatus 170 is formed integrally as part of the apparatus 170. Similarly, to the previous embodiments, the quadrupole quartet of RF quadrupole arrangement 182 will exert a quadrupole effect that defocuses an ion beam along a given direction, such as the Y-direction, and focuses the ion beam along a direction orthogonal to the given direction, such as along the Y-direction, for each of the acceleration gap G3A, acceleration gap G3B, acceleration gap G3C, and acceleration gap G3D.

For purposes of concision, the arrangement of the apparatus 170 may be referred to hereinafter as a local "DODODODO" configuration, indicating for a given direction, such as the Y-direction, a defocusing (DO) of the ion beam takes place at four consecutive acceleration gaps. As a corollary, for the given local DODODODO configuration with respect to the Y-direction, the apparatus 170 likewise provides a local FOFOFOFO configuration with respect to the X-direction, meaning that a focusing (FO) of the ion beam takes place at four consecutive acceleration gaps.

Figure 1D:
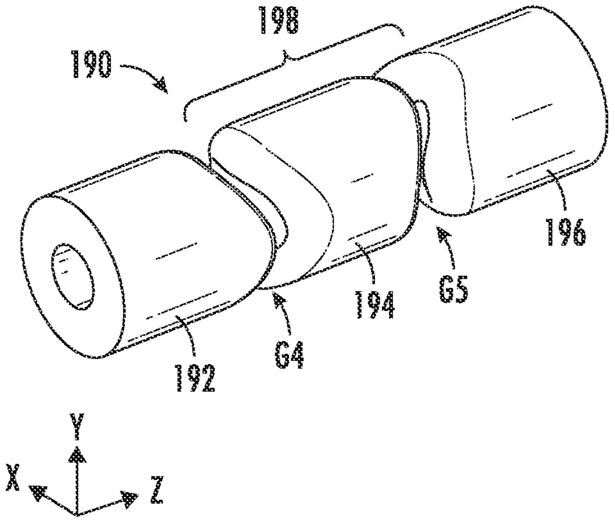
FIG. 1D shows an additional exemplary drift tube assembly, according to embodiments of the disclosure.

FIG. 1D shows an additional exemplary drift tube assembly, according to embodiments of the disclosure. The apparatus 190 may represent an acceleration stage of a linear accelerator, similarly to apparatus 150. The apparatus 190 is formed of a plurality of drift tubes, including a first grounded drift tube 192, a second grounded drift tube 196, and a powered drift tube 194, disposed between the first grounded drift tube 192 and the second grounded drift tube 196. Similarly to apparatus 150, the apparatus 190 represents a double gap configuration including an acceleration gap G4 and acceleration gap G5. In this example, however, a quadrupole configuration 198 is formed within the first grounded drift tube 192, second grounded drift tube 196, and powered drift tube 194 that may be termed a local FODO configuration. In this example, the structure of the first grounded drift tube 192 and powered drift tube 194 at the gap G4 may be arranged to provide a focusing in the Y-direction (and thus defocusing in the X-direction), while the structure of the powered drift tube 194 and second grounded drift tube 196 and at the gap G5 is arranged to provide a defocusing in the Y-direction (and thus focusing in the X-direction). Such a configuration for a given acceleration stage of a linear accelerator may be combined with different configurations, such as those in FIGS. 1A-1C to provide flexible and tunable control of ion beam shaping, as the ion beam is conducted through various stages of a linear accelerator.

Figure 2:
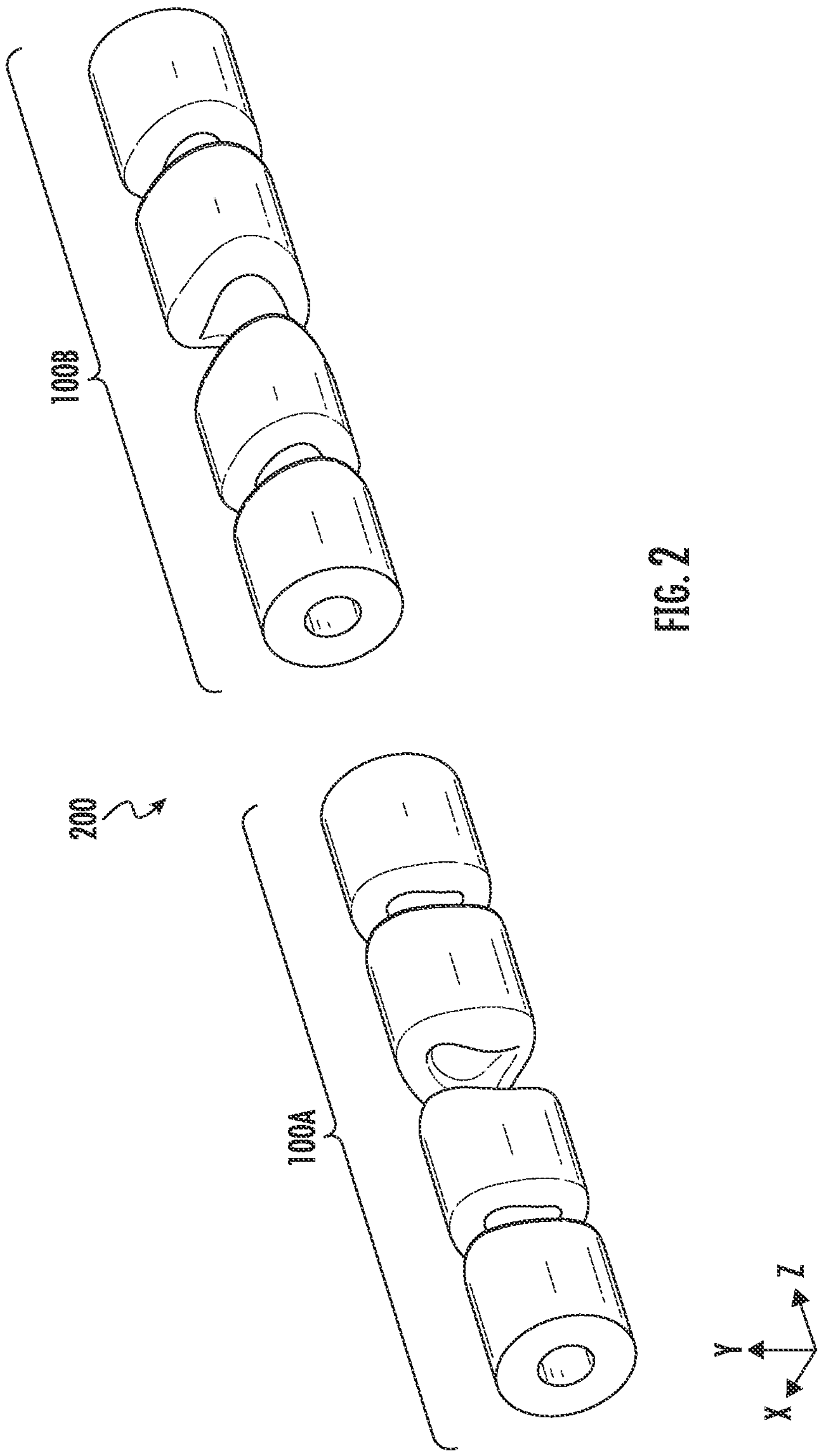
FIG. 2 shows an exemplary architecture of multiple drift tube assemblies, according to embodiments of the disclosure.

FIG. 2 shows an exemplary architecture of multiple drift tube assemblies, according to embodiments of the disclosure. A drift tube architecture 200 is illustrated, where the drift tube architecture 200 encompasses two drift tube assemblies, shown as drift tube assembly 100A and drift tube assembly 100B. The drift tube assembly 100A may correspond to a first acceleration stage of a linear accelerator, while the drift tube assembly 100B may correspond to a second acceleration stage that is disposed downstream of the first acceleration stage of the linear accelerator. In one example, the drift tube assembly 100A may be immediately adjacent to the drift tube assembly 100B. Thus, an ion beam traversing the drift tube architecture 200 that is subjected to acceleration and focusing from the drift tube assembly 100A may be immediately subjected to the acceleration and focusing of the drift tube assembly 100B. The drift tube assembly 100A may be formed from the same set of drift tubes and contained in the drift tube assembly 100B. In particular, the drift tube assembly 100A and the drift tube assembly 100B may be arranged generally as the same structure as in apparatus 100, described above. For example, the drift tube assembly 100A and drift tube assembly 100B may be characterized as a triple gap acceleration stage, having an integrated quadrupole triplet, as detailed with respect to FIG. 1A. Thus, drift tube assembly 100A and drift tube assembly 100B are each characterized by a local DODODO structure, where the drift tube arrangement is configured to exert a defocusing of an ion beam across each of three separate acceleration gaps for a given direction, either along the X-axis or along the Y-axis (see FIG. 1 for further description of the individual acceleration gaps).

A hallmark of the drift tube architecture 200 is that the orientation of the drift tube assembly 100A differs from the orientation of the drift tube assembly 100B. The drift tube assembly 100A may be seen to be rotated 90 degrees about the Y axis within the X-Y plane, with respect to the drift tube assembly 100B. As a consequence, the quadruple triplet formed in drift tube assembly 100A exerts a defocusing of an ion beam along a Y-direction at each of three acceleration gaps, while the quadrupole triplet formed in the drift tube assembly 100B exerts a defocusing of the ion beam along the X-direction, and a focusing effect along the Y-direction. Thus, with respect to the Y-direction, the drift tube assembly 100A exerts just a defocusing effect across all acceleration gaps, while the drift tube assembly 100B exerts just a focusing effect across all acceleration gaps. In this manner, the drift tube architecture 200 may be deemed to provide a global DOFO or FODO effect, where for a given direction, just defocusing takes place in the acceleration gaps of the drift tube assembly 100A and just focusing takes place in the acceleration gaps of the drift tube assembly 100B. Said differently, the drift tube architecture 200 combines a local DODODO structure (equivalent to a local FOFOFO structure) for each of two drift tube assemblies (corresponding to two acceleration stages) in order to generate a global FODO effect across the two acceleration stages.

Figure 3A:
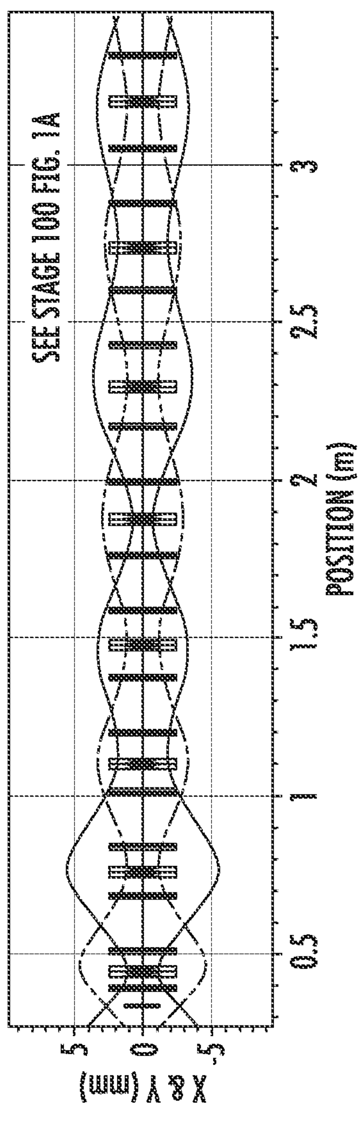
FIG. 3A depicts a simulation of an ion beam profile in a linear accelerator, arranged according to some embodiments of the disclosure.
Figure 3B:
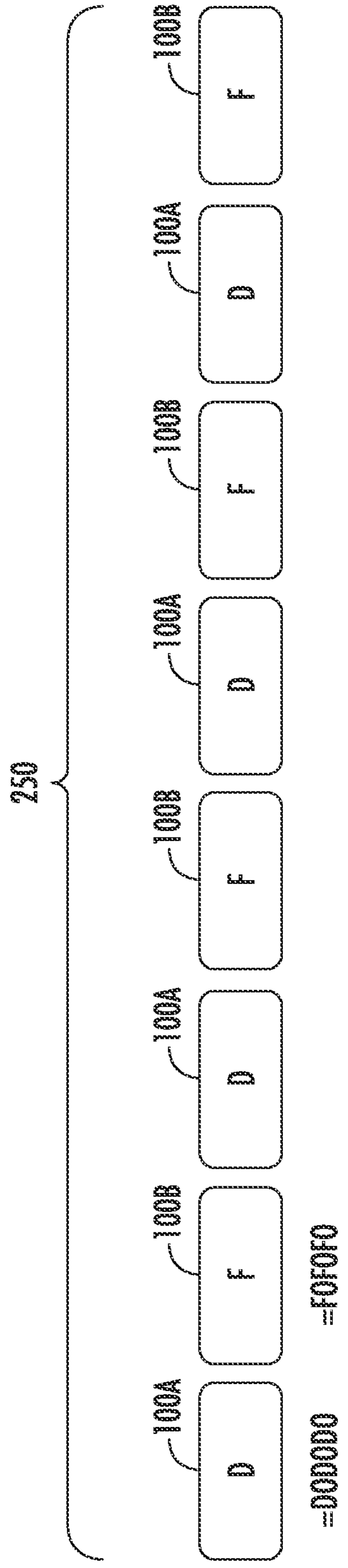
FIG. 3B depicts an exemplary linear accelerator architecture, corresponding to the beam profile of FIG. 3A, according to embodiments of the disclosure.

By forming a local DODODO structure within a drift tube assembly of an acceleration stage, various embodiments facilitate more flexible control of beam shape and size. To emphasize this point, FIG. 3A depicts a simulation of an ion beam profile in a linear accelerator, arranged according to some embodiments of the disclosure, while FIG. 3B depicts an exemplary linear accelerator architecture, corresponding to the beam profile of FIG. 3A. As depicted in FIG. 3B, the linear accelerator architecture 250 includes a series of eight acceleration stages, each stage configured in a triple gap configuration, having a quadrupole triplet characterized by a DODODO structure, as detailed above. Following the example of FIG. 2, adjacent acceleration stages are arranged according to the configuration where a first stage corresponds to a drift tube assembly 100A, having a local DODODO structure (labeled as D), while an adjacent stage has a configuration corresponding to the drift tube assembly 100B, having the local FOFOFO structure (labeled F), as described above. Thus, the linear accelerator architecture 250 includes 8 stages that alternate between local DODODO structure and local FOFOFO structure.

As a consequence of this structure of FIG. 3B, the focusing of an ion beam may take place as illustrated in FIG. 3A, In FIG. 3A, the abscissa indicates position along the Z-axis, or beam propagation direction, while the ordinate indicates the position of the outer edge of the ion beam, either along the X-axis (lighter curve) or along the Y-axis (darker curve). The position of eight stages is indicated by eight triplets of vertical narrow rectangles, representing the gaps between drift tubes in each of the stages, where the drift tubes are not shown for clarity. As illustrated, for a given direction (X- or Y), the width of the ion beam tends to alternately increase and decrease, reflecting the DFDFDFDF pattern of the linear accelerator architecture 250. While in the particular simulation shown, in the first two stages, the width of the ion beam in the X- and Y-directions exhibits a relatively greater fluctuation, up to approximately 5 mm maximum radius, in the later stages, the maximum radius is closer to 3 mm. Thus, the overall beam envelope is maintained at approximately 6 mm or less using the linear accelerator architecture 250, formed with alternating local DODODO and FOFOFO configurations.

Figure 4B:
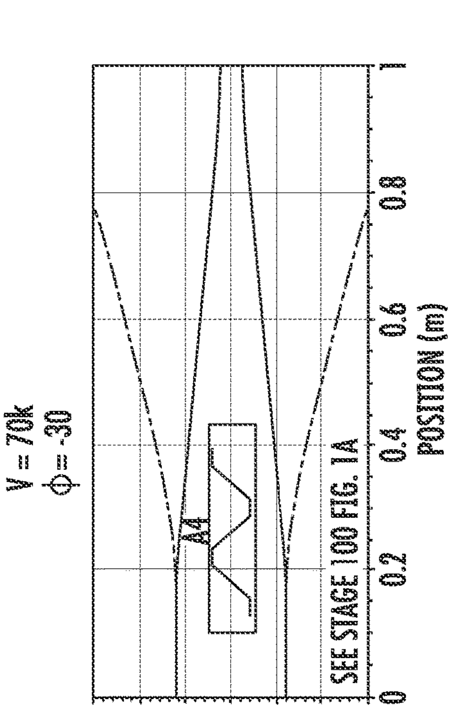
FIG. 4B illustrates a simulation of another ion beam profile generated by the apparatus of FIG. 1A, under a second operating condition.
Figure 4A:
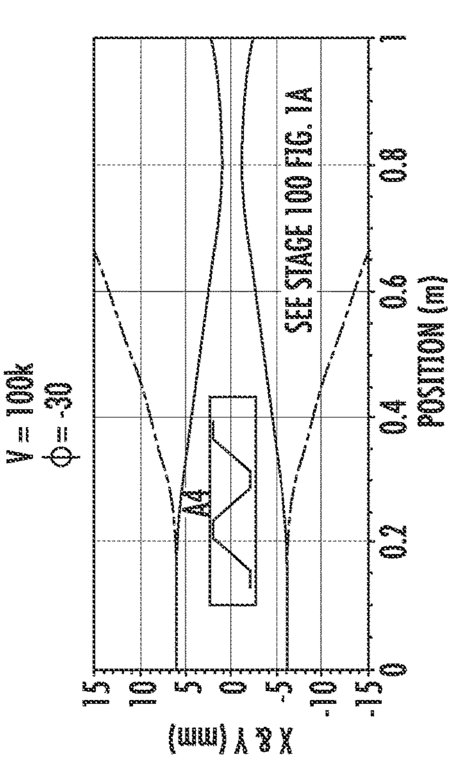
FIG. 4A illustrates a simulation of an ion beam profile generated by the apparatus of FIG. 1A, under a first operating condition.

In accordance with embodiments of the disclosure, the overall focusing strength of a linear accelerator arranged with a local DODODO quadrupole structure may be tuned by varying certain parameters applied to the linear accelerator. FIG. 4A illustrates a simulation of an ion beam profile generated by the apparatus of FIG. 1A, under a first operating condition, while FIG. 4B illustrates a simulation of another ion beam profile generated by the apparatus of FIG. 1A, under a second operating condition. In FIG. 4A, a model is shown for a 1.1 MeV P+ ion beam transport through a single acceleration stage characterized by a local DODODO structure as in FIG. 1A. The applied voltage to the drift tube assembly in this example is 100 kV, with a −30 degree phase difference. The abscissa indicates position along the Z-axis, or beam propagation direction, while the ordinate indicates the position of the outer edge of the ion beam, either along the X-axis (solid curve) or along the Y-axis (dashed curve). As shown in FIG. 4A, the local DODODO structure focuses the beam in the X-direction and defocuses the ion beam in the Y-direction. In this example, the ion beam becomes most focused along the X-direction (smallest width) at 0.8 m distance along the Z-axis, while the ion beam "blows up" in the Y-direction to reach 15 mm radius at 0.65 m along the Z-axis.

In FIG. 4B, a model is shown for the 1.1 MeV P+ ion beam transport through an acceleration stage characterized by the local DODODO structure as in FIG. 1A, is shown for the same −30 degree phase difference, but with RF voltage at the drift tube assembly reduced to 70 kV. In this example, the focusing exerted by the resultant quadrupole triplet is reduced along the X-direction, so that the minimum beam width is realized at approximately one meter. Likewise, the defocusing along the Y-direction is less pronounced, where the ion beam "blows up" in the Y-direction to reach 15 mm radius at 0.77 m along the Z-axis. Thus, by changing the relative amplitude of the RF voltage applied to a drift tube assembly, the focusing and defocusing strength of the resultant quadrupole triplet is varied in a manner that substantially alters the change in beam size in both X- and Y-directions as a function of distance along the Z-axis.

Figure 5:
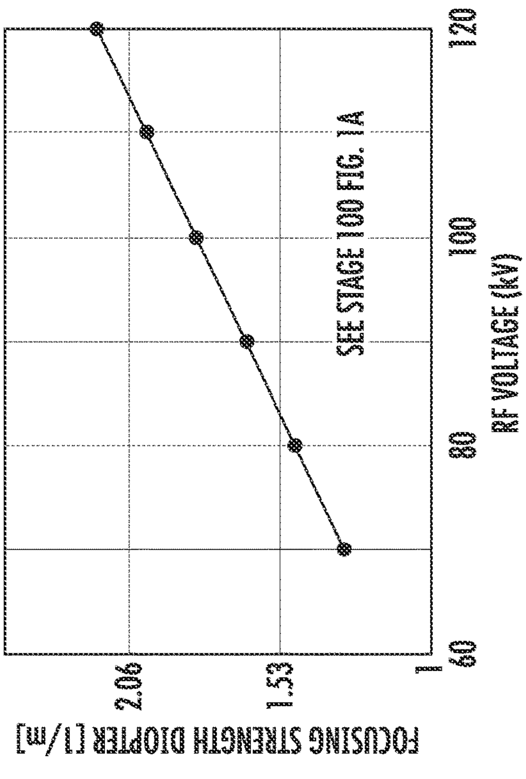
FIG. 5 is a graph depicting focusing strength as a function of applied voltage for the apparatus of FIG. 1A.

The variation of beam focusing as suggested in FIGS. 4A and 4B, can be systematically controlled by varying RF voltage, as detailed in FIG. 5. In particular, FIG. 5 is a graph depicting focusing strength as a function of applied voltage for the apparatus of FIG. 1A. The focusing strength is plotted in the ordinate as focusing strength diopter in units of 1/m, while the applied RF voltage is plotted on the abscissa. As depicted, focusing strength varies substantially and in a linear manner with voltage in the range of 70 kV to 120 kV shown. Note that adopting a similar approach to systematically control beam focusing in a drift tube assembly that employs a local DOFODO, FODO, etc., structure is prohibitively difficult because the focusing effect and defocusing effects tend to counteract each other locally. In other words, the systematic control of beam focusing by changing voltage is not practical in an acceleration stage where a given drift tube assembly is arranged such that first gap provides focusing and the next gap provides defocusing.

Figure 6:
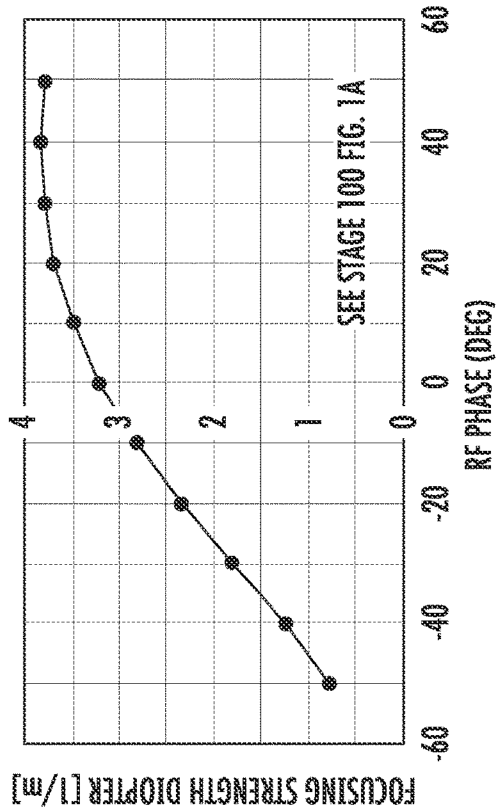
FIG. 6 is a graph depicting focusing strength as a function of RF phase for the apparatus of FIG. 1A.

In additional embodiments, phase control of signals applied to a drift tube assembly may be employed to control focusing strength. FIG. 6 is a graph depicting focusing strength as a function of RF phase for the voltage on the apparatus of FIG. 1A with respect to the hypothetical synchronous ion in a bunched ion beam. This RF phase may be directly translated into a phase offset that is set by a control system for control purposes for a given drift tube assembly.

As shown, the focusing strength of the DODODO arrangement of FIG. 1A increases substantially and somewhat linearly as phase changes from −50 degrees to −10 degrees, and then shows an asymptotic behavior above +20 degrees. Thus, focusing strength of the DODODO arrangement can be readily changed with small changes in phase in the range of at least −50 degrees to zero degrees, providing a facile approach to control beam focusing. Note that adopting a similar approach to systematically control beam focusing by varying RF phase in a drift tube assembly arranged in a local DOFODO, FODO, etc., configuration is prohibitively difficult because the focusing effect and defocusing effect tend to counteract each other locally.

Figure 7:
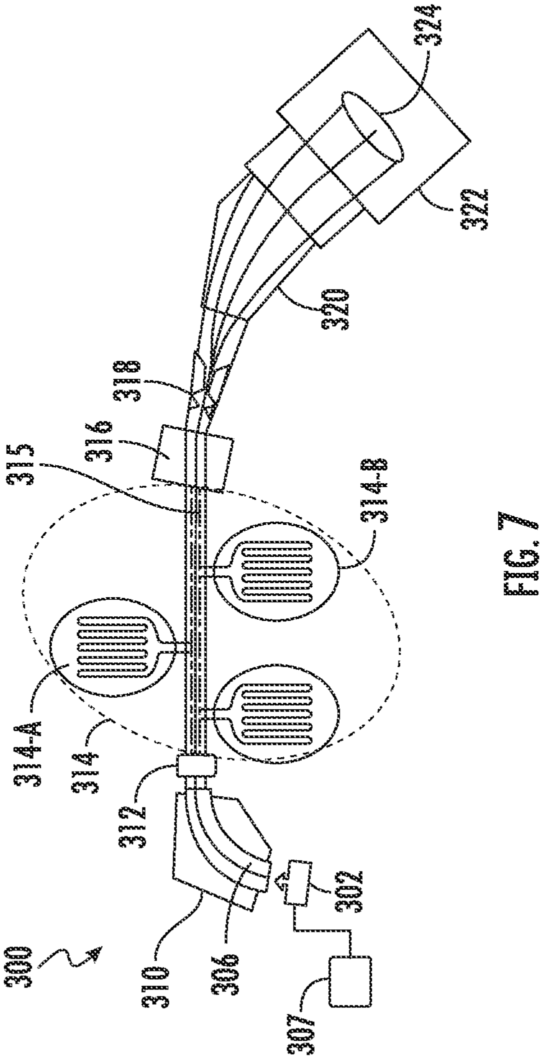
FIG. 7 depicts an exemplary ion implanter according to embodiments of the disclosure.

FIG. 7 depicts a schematic of an ion implanter, according to embodiments of the disclosure. The ion implanter 300 includes acceleration stages 314-A, 314-B of a LINAC, shown as linear accelerator 314. The ion implanter 300, may represent a beamline ion implanter, with some elements not shown for clarity of explanation. The ion implanter 300 may include an ion source 302, and a gas box 307 as known in the art. The ion source 302 may include an extraction system including extraction components and filters (not shown) to generate an ion beam 306 at a first energy. Examples of suitable ion energy for the first ion energy range from 5 keV to 100 keV, while the embodiments are not limited in this context. To form a high energy ion beam, the ion implanter 300 includes various additional components for accelerating the ion beam 306.

The ion implanter 300 may include an analyzer 310, functioning to analyze the ion beam 306 as in known apparatus, by changing the trajectory of the ion beam 306, as shown. The ion implanter 300 may also include a buncher 312, and a linear accelerator 314 (shown in the dashed line), disposed downstream of the buncher 312, where the linear accelerator 314 is arranged to accelerate the ion beam 306 to form a high energy ion beam 315, having an energy greater than the ion energy of the ion beam 306, before entering the linear accelerator 314. The buncher 312 may receive the ion beam 306 as a continuous ion beam and output the ion beam 306 as a bunched ion beam to the linear accelerator 314. The linear accelerator 314 may include a plurality of acceleration stages (314-A, 314-B, . . . to 314-Z (not shown)), arranged in series, as shown. In various embodiments, the ion energy of the high energy ion beam 315 may represent the final ion energy for the ion beam 306, or approximately the final ion energy. In various embodiments, the ion implanter 300 may include additional components, such as filter magnet 316, a scanner 318, collimator 320, where the general functions of the scanner 318 and collimator 320 are well known and will not be described herein in further detail. As such, a high energy ion beam, represented by the high energy ion beam 315, may be delivered to an end station 322 for processing a substrate 324. Non-limiting energy ranges for the high energy ion beam 315 include 500 keV-10 MeV, where the ion energy of the ion beam 306 is increased in steps through the various acceleration stages of the linear accelerator 314. In accordance with various embodiments of the disclosure, one or more of the acceleration stages of the linear accelerator 314 may include a drift tube assembly, with integrated quadrupole arrangement, as detailed with respect to the embodiments of FIGS. 1A-6. An advantage provided by the ion implanter 300 is that the focusing of the high energy ion beam 315 as conducted through the linear accelerator 314 may be improved, due to the operation of the integrated quadrupole configurations, where a local DODODO (or DODO) structure is provided in a series of acceleration stages.

Figure 8A:
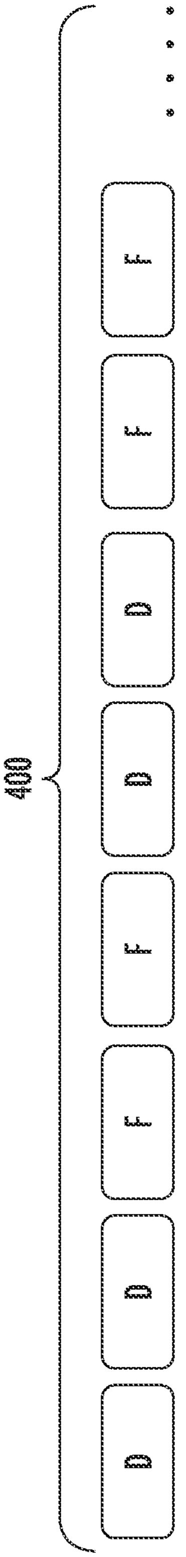
FIG. 8A depicts another exemplary linear accelerator architecture, according to embodiments of the disclosure.
Figure 8B:
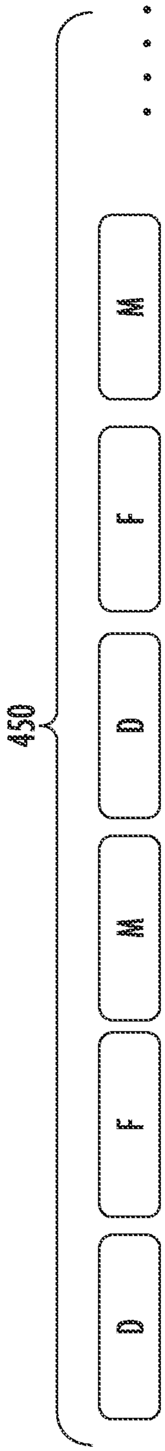
FIG. 8B depicts a further exemplary linear accelerator architecture, according to embodiments of the disclosure.

While the aforementioned embodiments of linear accelerators focus on architecture where the orientation of drift tubes may vary from successive acceleration stages to generate an alternating sequence of local DODODO and local FOFOFO (see FIG. 3B), other LINAC architectures are possible, according to further embodiments of the disclosure. FIG. 8A and FIG. 8B provide two further examples of linear accelerator architecture, according to embodiments of the disclosure. In FIG. 8A, the linear accelerator architecture 400 provides an acceleration stage pattern according to DDFFDDFF, and so forth. Specifically, this pattern represents a sequence of two successive acceleration stages having a local DODODO structure, immediately followed by a sequence of two consecutive acceleration stages having a local FOFOFO structure, followed by another sequence of two successive acceleration stages having a local DODODO structure, and so forth.

In FIG. 8B, the linear accelerator architecture 450 provides an acceleration stage pattern according to DFMDFM, and so forth. Specifically, this pattern represents a sequence of one acceleration stage having a local DODODO structure, immediately followed by an acceleration stage having a local FOFOFO structure, followed by an acceleration stage where the local structure within a given acceleration stage is mixed (M). For example, a mixed structure in a quadrupole triplet embodiment may be represented by FODOFO (see also FIG. 1D) and so forth.

Other quadrupole configurations are possible according to further embodiments, where the local structure within a single acceleration stage is varied, such as DODOFO, or DOFOFO, where the "global" quadrupole structure is varied, such as DDDFFF, DFODFO etc.

Moreover, in additional embodiments of the disclosure that encompass double gap acceleration stages (see, e.g., FIG. 1D), the same principles as outlined above with respect to triple gap configurations will apply. Thus, in one embodiment of a double gap linear accelerator, the sequence may be as follows: a first acceleration stage having a DODO configuration, followed immediately by a next acceleration stage having a FOFO configuration, followed immediately by another acceleration stage having a DODO configuration, and so forth. For brevity, this architecture equivalent to a DFDF (double gap) . . . configuration where the "D" structure denotes a DODO arrangement and the "F" structure denotes a FOFO arrangement within a given acceleration stage. Thus, in further embodiments, a DDFFDDFF (double gap) linear accelerator architecture is contemplated. The embodiments are not limited in this context.

In view of the above, a first advantage afforded by the present embodiments is the avoidance of extra cost, greater beamline length, and greater complexity associated with known linear accelerators for ion implanters that employ a quadrupole apparatus for beam focusing that is separate from a drift tube assembly. Another advantage of the present embodiments is the ability to readily adjust focusing strength of the quadrupole arrangement by merely adjusting the RF phase of the ion beam or adjusting the RF voltage applied to an RF drift tube.

While certain embodiments of the disclosure have been described herein, the disclosure is not limited thereto, as the disclosure is as broad in scope as the art will allow and the specification may be read likewise. Therefore, the above description are not to be construed as limiting. Those skilled in the art will envision other modifications within the scope and spirit of the claims appended hereto.

The invention claimed is:

1. A linear accelerator, comprising:

a buncher to receive a continuous ion beam and output a bunched ion beam; and a plurality of acceleration stages, to accelerate and focus the bunched ion beam, the plurality of acceleration stages comprising:

a first acceleration stage, having a first drift tube assembly, the first drift tube assembly forming a multi-gap configuration corresponding to a first plurality of acceleration gaps, the first drift tube assembly further defining a first plurality of RF quadrupoles formed at the first plurality of acceleration gaps, respectively, wherein the first plurality of RF quadrupoles are arranged to defocus the bunched ion beam and not to focus the bunched ion beam along a first direction at the first plurality of acceleration gaps, respectively, the first direction extending perpendicularly to a beam propagation direction; and a second acceleration stage, disposed downstream of the first acceleration stage, and having a second drift tube assembly, the second drift tube assembly forming the multi-gap configuration, the second drift tube assembly further defining a second plurality of RF quadrupoles formed at a second plurality of acceleration gaps, respectively, wherein the second plurality of RF quadrupoles are arranged to focus the bunched ion beam and not to defocus the bunched ion beam at the second plurality of acceleration gaps along the first direction, wherein the first plurality of RF quadrupoles define an elliptical shape or a sinusoidal shape at the first plurality of acceleration gaps, and wherein the second plurality of RF quadrupoles define an elliptical shape or a sinusoidal shape at the second plurality of acceleration gaps.

2. The linear accelerator of claim 1, wherein:

the first drift tube assembly and the second drift tube assembly define a double gap configuration, comprising a first grounded drift tube, an RF drift tube, disposed downstream to the first grounded drift tube, and a second grounded drift tube, disposed downstream to the RF drift tube, wherein the first plurality of RF quadrupoles are arranged in a defocus-defocus (DODO) configuration, arranged to defocus the ion beam along the first direction at a first acceleration gap and a second acceleration gap of the double gap configuration, and arranged to focus the ion beam along a second direction at the first acceleration gap and the second acceleration gap, the second direction extending perpendicular to the beam propagation direction and to the first direction, and wherein the second plurality of RF quadrupoles are arranged in a focus-focus (FOFO) configuration, arranged to focus the ion beam along the first direction at a first acceleration gap and a second acceleration gap of the double gap configuration, and arranged to defocus the ion beam along the second direction at the first acceleration gap and the second acceleration gap.

3. The linear accelerator of claim 1, wherein the first drift tube assembly and the second drift tube assembly defining a triple gap configuration, comprising a first grounded drift tube, a first RF drift tube, disposed downstream to the first grounded drift tube, and a second RF drift tube, disposed downstream to the first RF drift tube, and a second grounded drift tube, disposed downstream to the second RF drift tube, wherein the first plurality of RF quadrupoles are arranged in a defocus-defocus-defocus (DODODO) configuration, arranged to defocus the ion beam along the first direction at a first acceleration gap, a second acceleration gap, and a third acceleration gap of the triple gap configuration, and arranged to focus the ion beam along a second direction at the first acceleration gap, the second acceleration gap, and the third acceleration gap, the second direction extending perpendicular to the beam propagation direction and to the first direction, and wherein the second plurality of RF quadrupoles are arranged in a focus-focus-focus (FOFOFO) configuration, arranged to focus the ion beam along the first direction at a first acceleration gap, a second acceleration gap, and a third acceleration gap of the triple gap configuration, and arranged to defocus the ion beam along the second direction at the first acceleration gap, the second acceleration gap, and the third acceleration gap.

4. The linear accelerator of claim 1, wherein the first plurality of RF quadrupoles and second plurality of quadrupoles are integrally incorporated into the first drift tube assembly and the second drift tube assembly, respectively.

5. An ion implanter, comprising:

an ion source, to generate a continuous ion beam;

a linear accelerator, comprising a buncher and a plurality of acceleration stages, arranged to receive the continuous ion beam and generate a bunched ion beam, the plurality of acceleration stages comprising:

a first acceleration stage, having a first drift tube assembly, the first drift tube assembly forming a multi-gap configuration corresponding to a first plurality of acceleration gaps, the first drift tube assembly further defining a first plurality of RF quadrupoles formed at the plurality of first acceleration gaps, respectively, wherein the first plurality of RF quadrupoles are arranged to defocus the bunched ion beam and not to focus the bunched ion beam at a given gap of the first plurality of acceleration gaps along a first direction, extending perpendicular to a beam propagation direction; and a second acceleration stage, disposed downstream of the first acceleration stage and having a second drift tube assembly, the second drift tube assembly forming the multi-gap configuration corresponding to a second plurality of acceleration gaps, the second drift tube assembly further defining a second plurality of RF quadrupoles formed at the second plurality of acceleration gaps, respectively, wherein the second plurality of RF quadrupoles are arranged to focus the bunched ion beam and not to defocus the bunched ion beam at a given gap of the second plurality of acceleration gaps along the first direction, wherein the first plurality of RF quadrupoles define an elliptical shape or a sinusoidal shape at the first plurality of acceleration gaps, and wherein the second plurality of RF quadrupoles define an elliptical shape or a sinusoidal shape at the second plurality of acceleration gaps.

6. The ion implanter of claim 5, wherein:

the first drift tube assembly and the second drift tube assembly define a double gap configuration, comprising a first grounded drift tube, an RF drift tube, disposed downstream to the first grounded drift tube, and a second grounded drift tube, disposed downstream to the RF drift tube, wherein the first plurality of RF quadrupoles are arranged in a defocus-defocus (DODO) configuration, arranged to defocus the bunched ion beam along the first direction at a first acceleration gap and a second acceleration gap of the double gap configuration, and arranged to focus the bunched ion beam along a second direction at the first acceleration gap and the second acceleration gap, the second direction extending perpendicular to the beam propagation direction and to the first direction, and wherein the second plurality of RF quadrupoles are arranged in a focus-focus (FOFO) configuration, arranged to focus the bunched ion beam along the first direction at a first acceleration gap and a second acceleration gap of the double gap configuration, and arranged to defocus the bunched ion beam along the second direction at the first acceleration gap and the second acceleration gap.

7. The ion implanter of claim 5, wherein the first drift tube assembly and the second drift tube assembly defining a triple gap configuration, comprising a first grounded drift tube, a first RF drift tube, disposed downstream to the first grounded drift tube, and a second RF drift tube, disposed downstream to the first RF drift tube, a second grounded drift tube, disposed downstream to the second RF drift tube, wherein the first plurality of RF quadrupoles are arranged in a defocus-defocus-defocus (DODODO) configuration, arranged to defocus the bunched ion beam along the first direction at a first acceleration gap, a second acceleration gap, and a third acceleration gap of the triple gap configuration, and arranged to focus the bunched ion beam along the second direction at the first acceleration gap, the second acceleration gap, and the third acceleration gap, and wherein the second plurality of RF quadrupoles are arranged in a focus-focus-focus (FOFOFO) configuration, arranged to focus the bunched ion beam along the first direction at a first acceleration gap, a second acceleration gap, and a third acceleration gap of the triple gap configuration, and arranged to defocus the bunched ion beam along a second direction at the first acceleration gap, the second acceleration gap, and the third acceleration gap, the second direction extending perpendicular to the beam propagation direction and to the first direction.

8. The ion implanter of claim 5, wherein the first plurality of RF quadrupoles and second plurality of RF quadrupoles are integrally incorporated into the first drift tube assembly and the second drift tube assembly, respectively.

* * * * *